(12) United States Patent
Schuchmann et al.

(10) Patent No.: US 10,558,865 B2
(45) Date of Patent: Feb. 11, 2020

(54) ROUTE INSPECTION SYSTEM

(71) Applicant: General Electric Company, Schenectady, NY (US)

(72) Inventors: Chris Schuchmann, Melbourne, FL (US); Robert Peipert, Melbourne, FL (US); Timothy Brown, Erie, PA (US); Derek Woo, Melbourne, FL (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 124 days.

(21) Appl. No.: 15/651,067

(22) Filed: Jul. 17, 2017

(65) Prior Publication Data
US 2018/0039842 A1 Feb. 8, 2018

Related U.S. Application Data

(60) Provisional application No. 62/371,609, filed on Aug. 5, 2016.

(51) Int. Cl.
| | |
|---|---|
| *G06K 9/00* | (2006.01) |
| *B61L 23/04* | (2006.01) |
| *B61K 9/08* | (2006.01) |
| *G01C 21/34* | (2006.01) |
| *B60W 30/10* | (2006.01) |

(52) U.S. Cl.
CPC ............ *G06K 9/00791* (2013.01); *B61K 9/08* (2013.01); *B61L 23/041* (2013.01); *B61L 23/047* (2013.01); *B61L 23/048* (2013.01); *G06K 9/00651* (2013.01); *B60W 30/10* (2013.01); *G01C 21/3461* (2013.01)

(58) Field of Classification Search
CPC .. G06K 9/00791; G06K 9/00651; B61K 9/08; B61L 23/041; B61L 23/047; B61L 23/048; B60W 30/10; G01C 21/3461
USPC ........................................................ 701/411
See application file for complete search history.

(56) References Cited

U.S. PATENT DOCUMENTS

2012/0192756 A1* 8/2012 Miller ....................... B61K 9/08
                                                            104/2
2012/0274772 A1 11/2012 Fosburgh et al.
(Continued)

OTHER PUBLICATIONS

K. Hacker, "'Sun kink' cause of June train crash, says BNSF", Aug. 13, 2013, http://www.turlockjournal.com/archives/21296/ (2 pages).
(Continued)

*Primary Examiner* — Marthe Y Marc-Coleman
(74) *Attorney, Agent, or Firm* — Christopher R. Carroll; The Small Patent Law Group, LLC

(57) ABSTRACT

A route inspection system includes one or more processors configured to identify a reference location in sensor data provided by one or more sensors onboard a vehicle system. The reference location is identified along a route being traveled by the vehicle system. The one or more processors also are configured to identify a location of interest in subsequent sensor data provided by the one or more sensors. The location of interest identified along the route being traveled by the vehicle system. The one or more processors also are configured to determine a degree of curvature in the route based on a difference between the reference location and the location of interest.

20 Claims, 12 Drawing Sheets

(56) References Cited

U.S. PATENT DOCUMENTS

| | | | | |
|---|---|---|---|---|
| 2013/0176435 A1* | 7/2013 | Haas | ............... | B61L 23/044 |
| | | | | 348/148 |
| 2014/0152814 A1* | 6/2014 | Farritor | ............... | B61K 9/08 |
| | | | | 348/142 |
| 2015/0131108 A1* | 5/2015 | Kainer | ............... | B61K 9/08 |
| | | | | 356/612 |
| 2015/0268172 A1* | 9/2015 | Naithani | ............... | B61K 9/08 |
| | | | | 348/129 |
| 2015/0375765 A1* | 12/2015 | Mustard | ............... | B61L 99/00 |
| | | | | 701/19 |
| 2017/0106885 A1* | 4/2017 | Singh | ............... | B61L 23/044 |

OTHER PUBLICATIONS

U.S. Department of Transportation, Federal Railroad Administration; "49 CFR Ch. II (Oct. 1, 2011 Edition)" pp. 100-154 (55 pages).
U.S. Department of Transportation, Federal Railroad Administration; "Track Buckling Prevention: Theory, Safety Concepts, and Applications" (168 pages).

* cited by examiner

ROUTE INSPECTION SYSTEM

CROSS-REFERENCE TO RELATED APPLICATIONS

This application claims priority to U.S. Provisional Application No. 62/371,609, which was filed on 5 Aug. 2016, and the entire disclosure of which is incorporated herein by reference.

FIELD

Embodiments of the subject matter disclosed herein relate to systems that inspect routes for deviations in shape of the route or other damage to the route. Other embodiments relate to systems for vehicle control based on route inspection.

BACKGROUND

Vehicles traveling on routes depend on the routes having a defined or consistent shape to ensure safe travel on the routes. As one example, rails of a track on which a rail vehicle moves need to have a defined shape that is free or substantially free (e.g., within manufacturing or installation tolerances) of deviations from the defined shape. Thermal misalignments are one example of misaligned rails in a track that can present a hazard to an approaching rail vehicle. These misalignments can include sun kinks, as the misalignments develop along the route during hot weather conditions when conductive components of the route (e.g., a rail) expand. The expansion creates compressive tension in the metal component, which causes the rail to buckle or otherwise become misaligned.

A thermal misalignment in a rail can include a lateral bending of the rail that is outside of a straight shape or designated bend in the rail. A length of a thermal misalignment that poses problems for travel of a rail vehicle may be on the order of forty to sixty feet, or twelve to eighteen meters (e.g., along the length of the track). Such a thermal misalignment can cause the rail to deviate from the intended or previous location of the rail (e.g., the location or shape of the rail as previously installed on a surface or as previously repaired) by as much as thirty inches or more (e.g., seventy-six centimeters).

Detection of these types of thermal misalignments in a route can aid in ensuring safe travel of vehicles over the route.

BRIEF DESCRIPTION

In one embodiment, a system (e.g., a route inspection system) includes one or more processors configured to identify a reference location in sensor data provided by one or more sensors onboard a vehicle system. The reference location is identified along a route being traveled by the vehicle system. The one or more processors also are configured to identify a location of interest in subsequent sensor data provided by the one or more sensors. The location of interest identified along the route being traveled by the vehicle system. The one or more processors also are configured to determine a degree of curvature in the route based on a difference between the reference location and the location of interest.

In one embodiment, a method (e.g., for inspecting a route) includes identifying a reference location in sensor data provided by one or more sensors onboard a vehicle system. The reference location is identified along a route being traveled by the vehicle system. The method also includes identifying a location of interest in subsequent sensor data provided by the one or more sensors. The location of interest is identified along the route being traveled by the vehicle system. The method also includes determining a degree of curvature in the route based on a difference between the reference location and the location of interest.

In one embodiment, a system includes one or more processors configured to identify a reference location in sensor data provided by one or more sensors onboard a vehicle system. The reference location is identified along a route being traveled by the vehicle system, and the one or more processors also are configured to identify a location of interest in subsequent sensor data provided by the one or more sensors. The location of interest is identified along the route being traveled by the vehicle system. The one or more processors are configured to determine a degree of curvature in the route based on a difference between the reference location and the location of interest. The one or more processors also are configured to implement one or more responsive actions responsive to determining the misalignment in the route. The one or more responsive actions include one or more of automatically slowing or stopping movement of the vehicle system, communicating a warning signal to another vehicle traveling toward the misalignment in the route, communicating the warning signal to another vehicle scheduled to travel toward the misalignment in the route, remotely controlling movement of another vehicle traveling toward the misalignment to alter the movement of the other vehicle, remotely controlling a switch in the route to prevent another vehicle from traveling over the misalignment, and/or communicating a signal to a repair facility to direct repair of the route at the misalignment.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
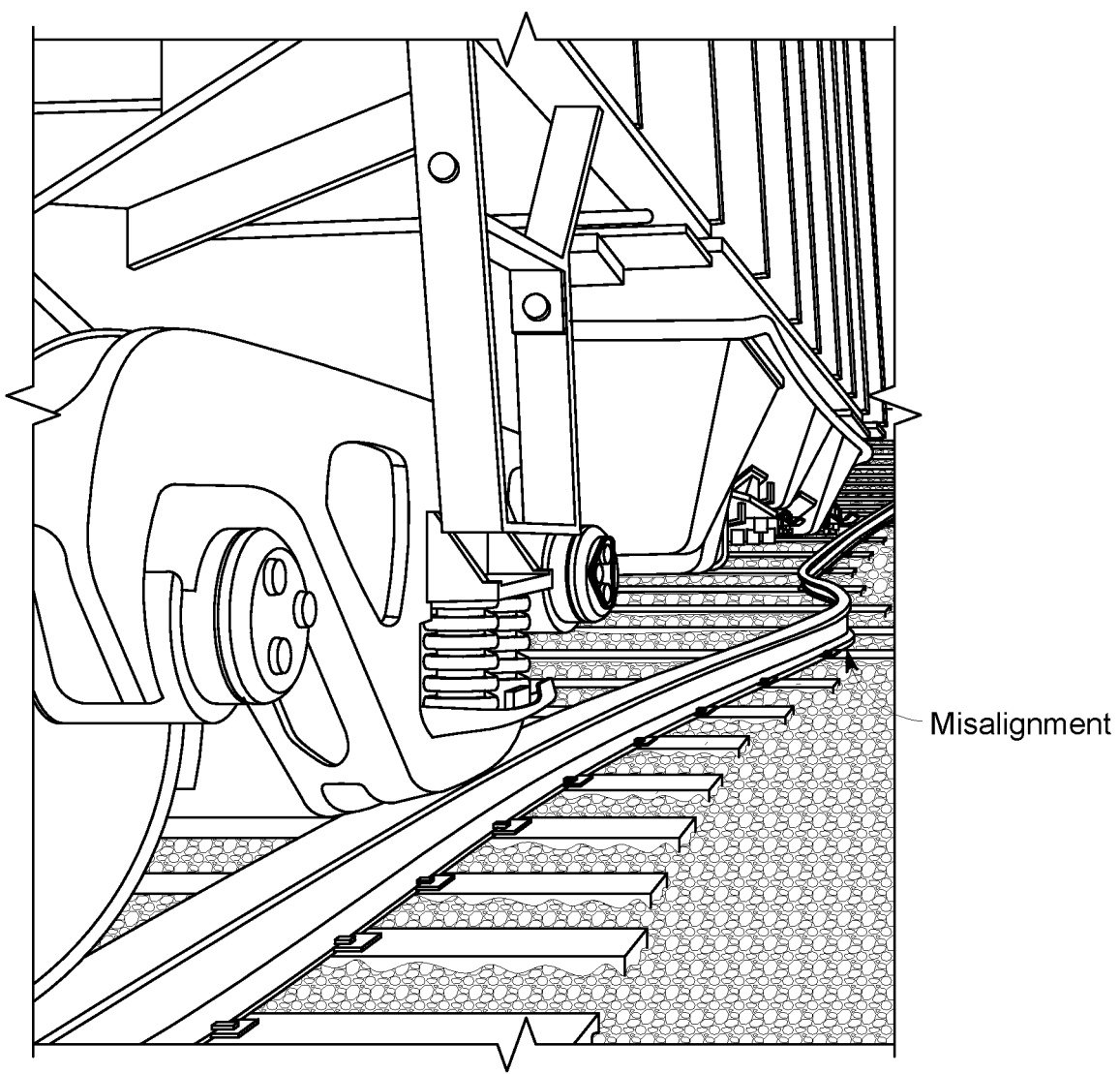
FIG. 1 illustrates one example of a thermal misalignment in a route.
Figure 2:
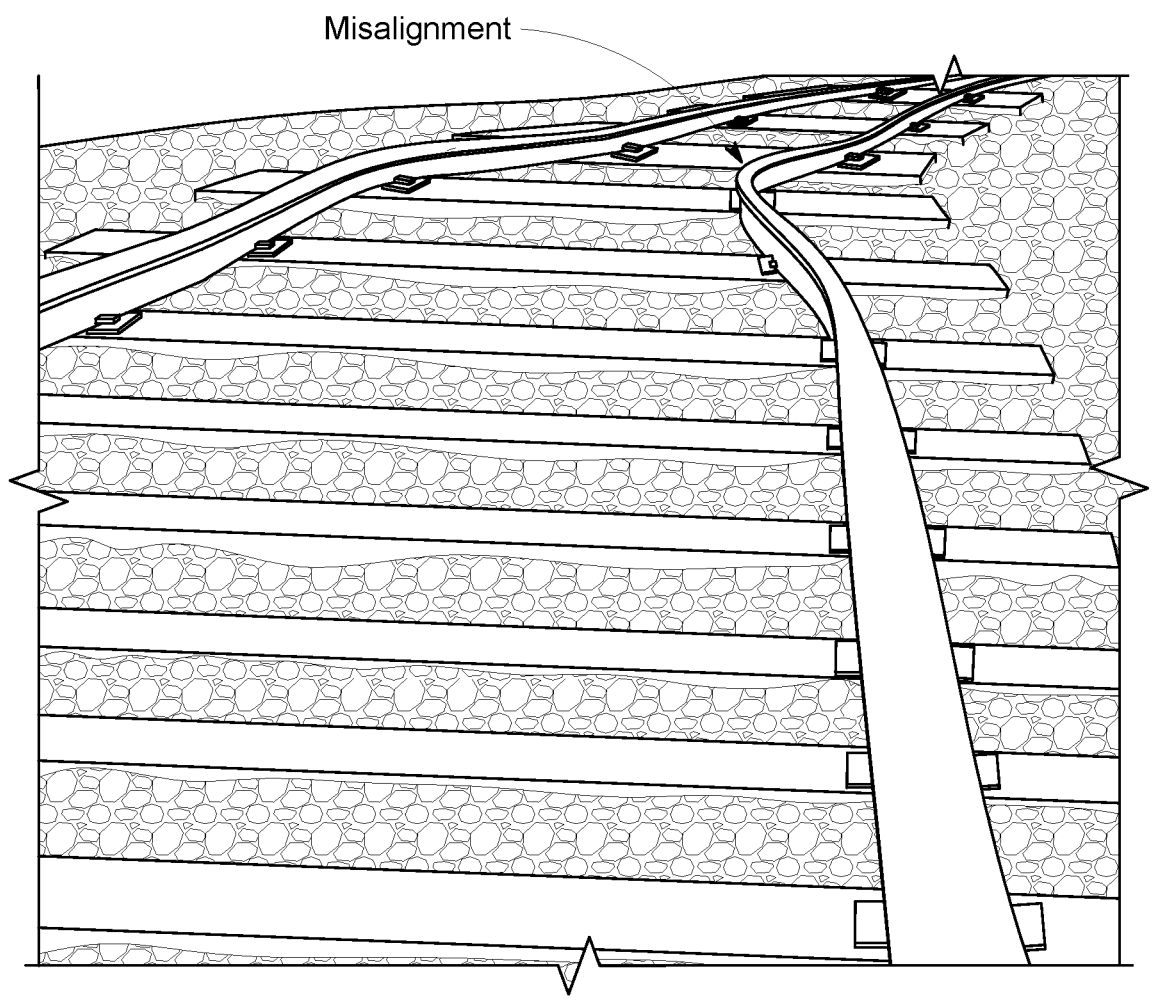
FIG. 2 illustrates another example of a thermal misalignment in a route.
Figure 3:
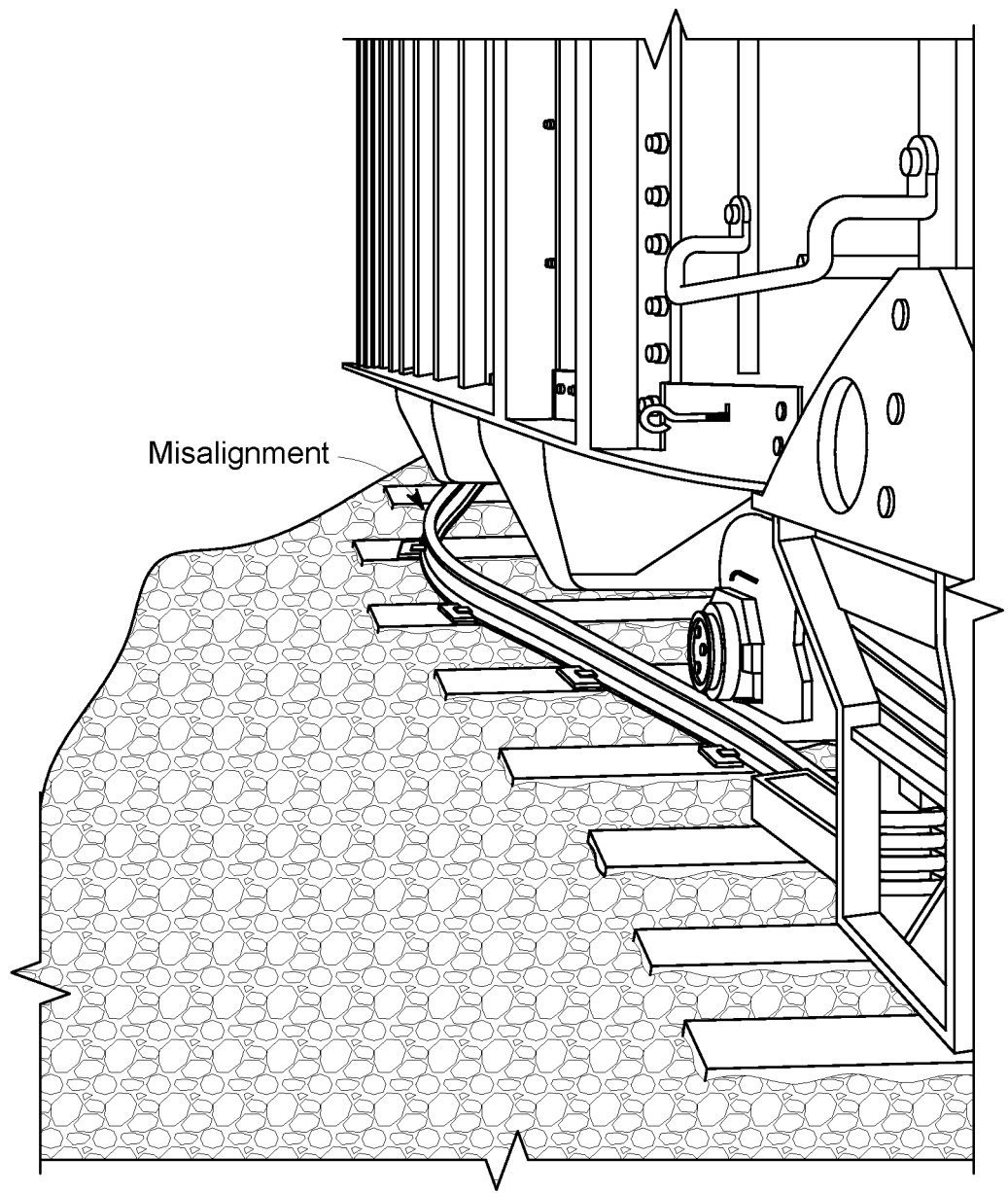
FIG. 3 illustrates another example of a thermal misalignment in a route.
Figure 4:
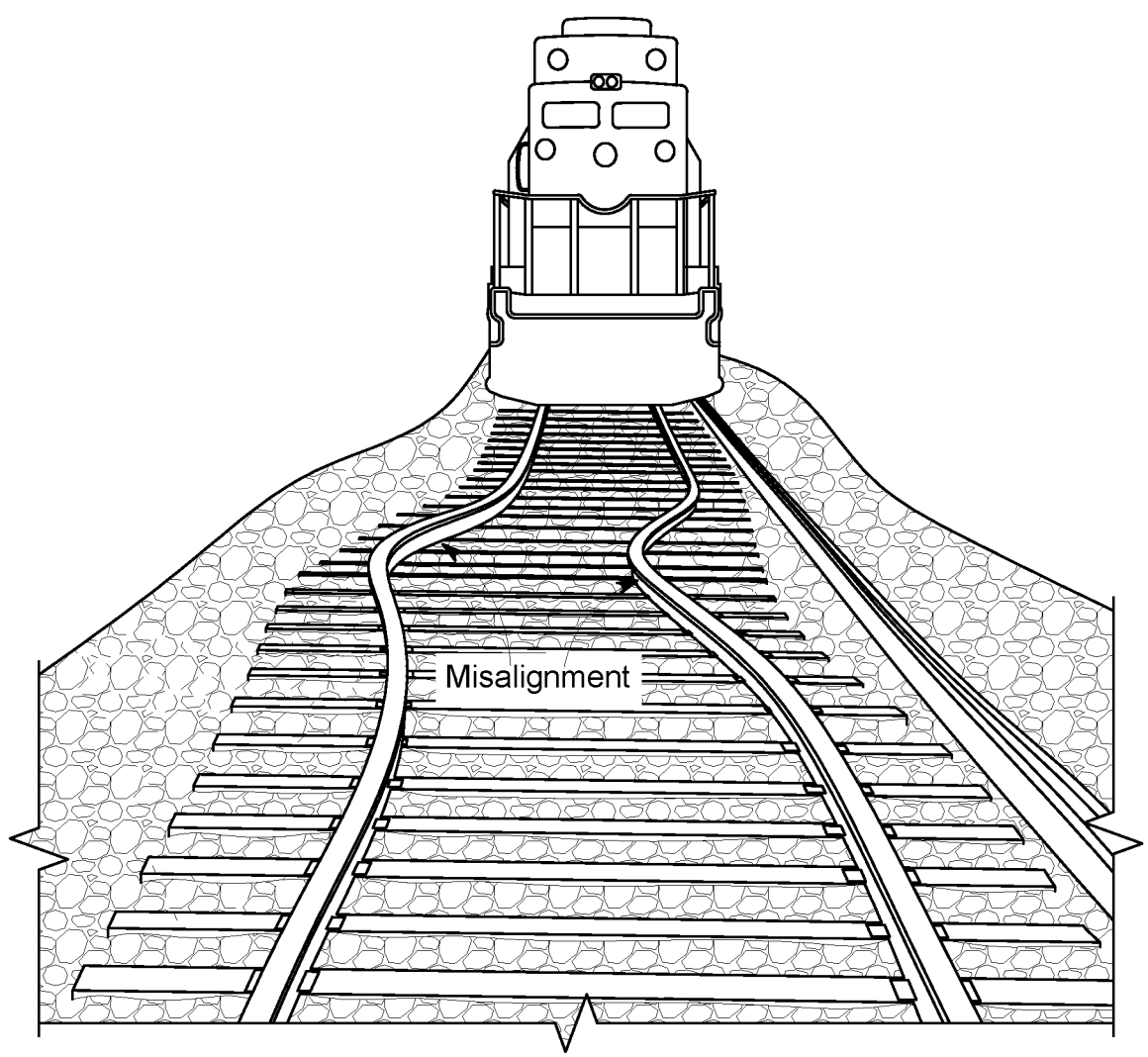
FIG. 4 illustrates another example of a thermal misalignment in a route.

One or more embodiments of the inventive subject matter described herein detect misalignments in a route being traveled by a vehicle. The misalignments may be thermal misalignments detected from a system onboard a moving vehicle. This allows the misalignments to be detected and one or more responsive actions initiated or implemented before the misalignments can present hazards to one or more vehicles subsequently traveling over the same segment of the route. One or more embodiments of the systems described herein can be disposed onboard vehicle systems formed from two or more vehicles traveling together along a route. The systems may be onboard the last trailing vehicle (e.g., along a direction of travel) for monitoring segments of the route that were recently traversed by the vehicle system. Additionally or alternatively, the systems may be onboard the first leading vehicle (e.g., along the direction of travel) for monitoring upcoming segments of the route yet to be traversed by the vehicle system (to allow responsive actions to be implemented or triggered prior to worsening the misalignment for one or more subsequent vehicle systems).

The systems described herein may monitor curvatures of a route, such as a track formed from one or more rails. While the description herein focuses on rail vehicles (e.g., locomotives, rail cars, etc.) and rail vehicle systems (e.g., trains, consists, etc.), not all embodiments are limited to rail vehicles or rail vehicle systems. One or more embodiments may be used with other vehicles or vehicle systems traveling on routes that may become misaligned, such as automobiles or mining vehicles traveling along routes that may be partially washed out or otherwise damaged, high rail vehicles, etc.

The systems can utilize sensors mounted on the moving vehicles to measure degrees of curvature (DoCs) of the route being traveled upon. In one embodiment, the DoC is a measurement of a change in trajectory of the route after transiting a section of a curve with a designated length (e.g., a chord length of 100 feet or 30.5 meters, or another distance). Optionally, an approximation of the DoC, or a scaled valued (using a different chord length) of the DoC may be measured and used.

The measured values of the DoC are used to calculate a nominal DoC of a segment of the route that was just transited by the vehicle system (referred to herein as a traveled segment), or a segment of the route about to be transited by the vehicle system (referred to herein as an upcoming segment). The nominal DoC can represent an average, moving average, zero frequency, or filtered (e.g., low pass filtered) curvature of the route. The nominal DoC can be calculated as the average or moving average of the DoCs measured (with the moving average being an average of a designated number of most recently obtained DoC measurements, such as the most recent ten measurements). Alternatively, the nominal DoC may be determined in another manner.

The nominal DoC may change at different locations along the route and/or at different times during movement of the vehicle over the route due to changes in curvature in the route (e.g., changes in radii of curvature in the route). The rate at which the nominal DoC changes (e.g., with respect to distance along the route) may be restricted. For example, legal or regulatory restrictions may limit how sharply different routes can curve in different locations, for different speed limits, etc. The systems described herein may prevent the nominal DoC from changing at a rate that is faster than a designated rate (e.g., which may be operator selected or obtained from laws or regulations). This can allow for changes in the DoC that are caused by misalignments in the route to stand out or apart from changes in the nominal DoC that are not caused by misalignments of the route.

To detect a misalignment such as a thermal misalignment, a deviation in the DoC from the nominal DoC can be calculated by subtracting the nominal DoC from an instantaneous DoC measurement. The instantaneous DoC measurement can be a single measurement of the DoC, but does not necessarily require being instantly measured with respect to time. The deviation between the instantaneous DoC and the nominal DoC can be referred to as a DoC deviation or difference. A DoC deviation that exceeds a threshold can indicate a misalignment in the route, such as a thermal misalignment. In order to detect relatively very small misalignments, the DoC deviations associated with a short length of the route (e.g. fifty feet or fifteen meters or less) may be summed together to form an accumulated DoC deviation. The accumulated DoC deviation that exceeds a designated threshold is indicative of a misalignment.

One or more technical effects of the inventive subject matter described herein is the detection of misalignments in a route during movement of a vehicle along the route, and the implementation of responsive actions in response thereto in order to ensure the safe travel of the vehicle and/or other vehicles. For example, responsive to detecting a thermal misalignment in the route, the systems described herein may direct the vehicle to automatically slow or stop movement, communicate a signal to other vehicles heading toward and/or scheduled to travel over the thermal misalignment to warn the other vehicles, communicate a signal to other vehicles heading toward and/or scheduled to travel over the thermal misalignment to automatically and remotely control the other vehicles to slow or stop movement during travel over the thermal misalignment, communicate a signal to other vehicles heading toward and/or scheduled to travel over the thermal misalignment to automatically and remotely control the other vehicles to change routes to avoid traveling over the thermal misalignment, communicate a signal to one or more route devices (e.g., switches, gates, etc.) that control where vehicles travel on the route that automatically and remotely controls the route device(s) to cause the other vehicles to travel on other routes (e.g., change a state of a switch to cause other vehicles to travel around and not over the thermal misalignment), communicate a signal to a scheduling or dispatch facility to cause the schedule of one or more other vehicles to be changed to cause the one or more other vehicles to not travel over the thermal misalignment, and/or communicate a signal to repair personnel that causes the personnel to travel to the thermal misalignment and inspect and/or repair the misalignment. These responsive actions can prevent damage to route infrastructure, prevent losses of cargo carried by the vehicles, and/or prevent a reduction of cargo or vehicular throughput along the route that could result from a derailment of the vehicles caused by the misalignment.

Figure 5:
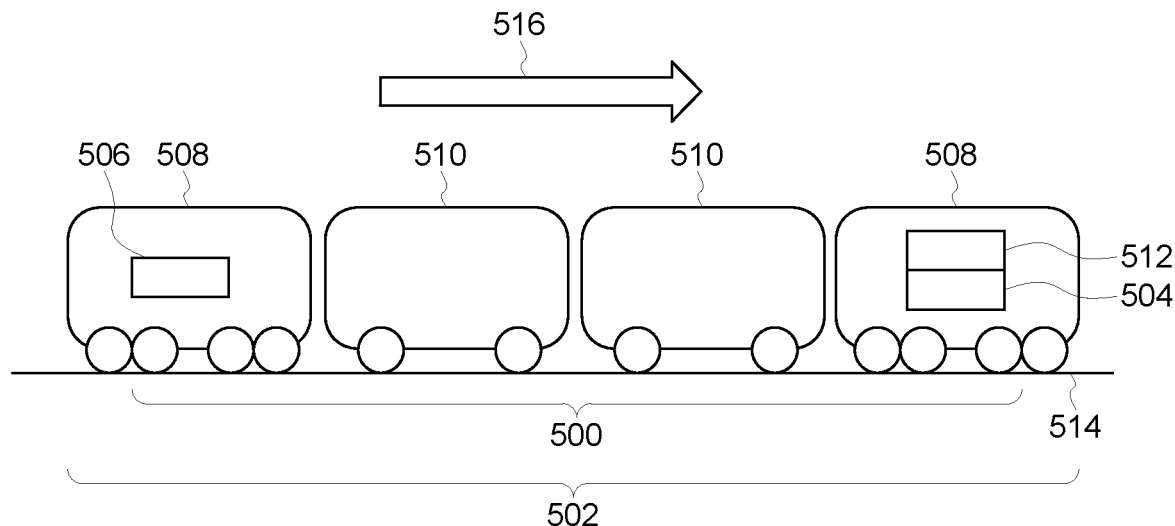
FIG. 5 illustrates one embodiment of a route inspection system disposed onboard a vehicle system.

FIG. 5 illustrates one embodiment of a route inspection system 500 disposed onboard a vehicle system 502. The route inspection system includes sensors 504, 506 disposed onboard one or more vehicles 508, 510 of the vehicle system and a monitoring system 512 (also referred to herein as a monitor) that examines data provided by the sensors to identify misalignments in a route 514 being traveled by the vehicle system. The vehicles 508 represent propulsion-generating vehicles, such as locomotives, automobiles, mining vehicles, or the like. The vehicles 510 represent non-propulsion-generating vehicles, such as rail cars, trailers, or the like. The vehicles 508, 510 in the vehicle system travel together along one or more routes. The vehicles 508, 510 may be mechanically coupled with each other. Optionally, the vehicles 508 may be logically coupled with each other without being mechanically coupled with each other. For example, the vehicles 508 may communicate with each other to coordinate movements of the vehicles 508 so that the vehicles 508, 510 travel together along the route, such as in a platoon. While the vehicle system and vehicles are shown and described herein as rail vehicle systems and rail vehicles, not all embodiments are limited to rail vehicles or rail vehicle systems. While the route may be described as a track formed from one or more rails, not all embodiments are limited to tracks or rails. For example, embodiments of the subject matter described herein may be used to detect warping, washouts, or other problems or damage to automobile routes (e.g., roads). The number and arrangement of the vehicles in the vehicle system are provided as one non-limiting example. Alternatively, the vehicle system may be formed from a different number of vehicles 508 and/or vehicles 510. In one embodiment, the vehicle system may be formed from a single vehicle 508 or 510.

The sensors may generate data representative of curvatures of the route during movement of the vehicle system along the route. The sensor 504 may be referred to as a leading sensor as the sensor 504 obtains data indicative of curvatures in segments of the route that are ahead of the vehicle system along a direction of travel or movement 516 of the vehicle system. The sensor 506 may be referred to as a trailing sensor as the sensor 506 obtains data indicative of curvatures in segments of the route that are behind the vehicle system (e.g., that the vehicle system recently traveled over) along the direction of travel or movement of the vehicle system. The route inspection systems described herein may determine DoCs of upcoming segments of routes being traveled upon and/or of segments of routes that the vehicle systems recently traveled over (e.g., behind the vehicle systems).

Figure 6:
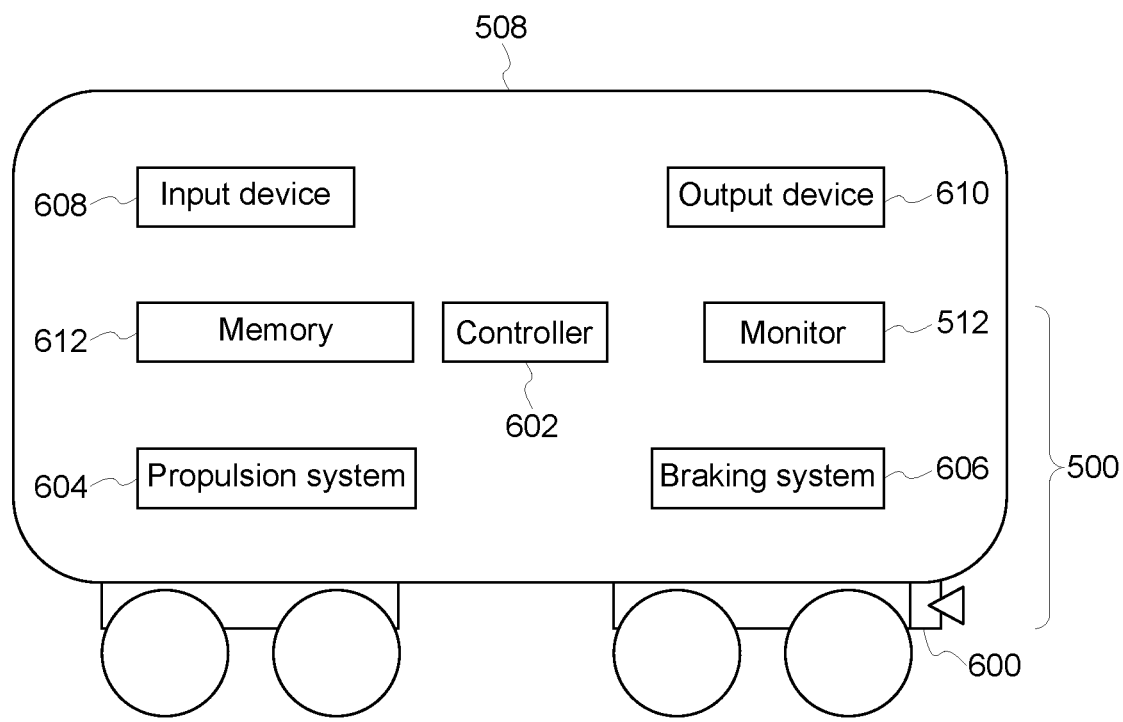
FIG. 6 illustrates one embodiment of the route inspection system shown in FIG. 5.

FIG. 6 illustrates one embodiment of the route inspection system 500 shown in FIG. 5. The route inspection system is shown as being disposed onboard a single vehicle 508 in FIG. 6, but optionally may be disposed onboard two or more vehicles. The route inspection system includes a sensor 600, which can represent the leading sensor 504 or the trailing sensor 506 shown in FIG. 5. The sensor 600 can be an optical sensor that obtains or measures information using light and generates data indicative of the information. As one example, the optical sensor can be a two or three-dimensional camera. Alternatively, the optical sensor can be a lidar sensor, a structured light sensor, infrared sensor, photo multiplied sensor (e.g., night vision sensor), white light sensor, radar sensor, spectrographic light sensor, etc.

The sensor is shown as being connected to an external surface of a truck or bogie of the vehicle, but optionally may be disposed elsewhere. For example, the sensor may be connected on a top, front, or rear surface of the vehicle and oriented toward the route such that the field of view of the sensor encompasses at least part of the route under examination. Optionally, the optical sensor may be disposed inside the vehicle, such as inside an operator cab of the vehicle, with the field of view of the sensor including at least a portion of the route under examination (e.g., via or through one or more windows or openings of the vehicle).

The monitoring system 512 receives data provided by the sensor and determines DoC in the route, nominal DoCs of the route, and DoC deviations based on or using this data. The monitoring system represents hardware circuitry that includes and/or is connected with one or more processors, such as one or more microprocessors, field programmable gate arrays, and/or integrated circuits. The arithmetic/logic unit (ALU) of one or more processors of the monitoring system can perform the calculations and comparisons described herein, and can change a state of one or more registers or flip flops to cause a buffer, such as a two- or three-state buffer, to drive outputs onto a wire indicative of the calculations or comparisons.

A controller 602 of the vehicle represents hardware circuitry that includes and/or is connected with one or more processors, such as one or more microprocessors, field programmable gate arrays, and/or integrated circuits. The controller controls operation of the vehicle, and generates signals communicated to a propulsion system 604 and/or braking system 606 of the vehicle to control movement of the vehicle. The propulsion system represents one or more engines, alternators, generators, batteries, motors, or the like, that operate to propel the vehicle along the route. The braking system represents one or more brakes, such as air brakes, friction brakes, or the like. The controller can communicate with the monitoring system and/or an input device 608 to receive instructions on how to control movement of the vehicle. The input device can represent one or more throttles, steering wheels, pedals, buttons, levers, touchscreens, keyboards, etc., that can be actuated by an operator to instruct the controller how to control movement of the vehicle. The controller can generate signals communicated to the propulsion system and/or braking system to implement the instructions received via the input device and/or monitoring system. The monitoring system can generate and communicate signals (e.g., the ALU of one or more processors of the monitoring system can change a state of one or more registers or flip flops to cause a buffer, such as a two- or three-state buffer, to drive outputs onto a wire indicative of the signals) to the controller responsive to detecting a misalignment in the route. These signals may cause the controller to automatically slow or stop movement of the vehicle.

An output device 610 represents one or more display devices, touchscreens (which may be different from or the same as the input device), speakers, lights, transceiving circuitry (e.g., modems, antennas, etc.), web enabled interfaces, web clients/servers, cloud interfaces, or the like, that visually and/or audibly notify an operator of the vehicle of misalignments in the route and/or communicate with one or more locations off-board the vehicle of the misalignment. The monitoring system can generate and communicate signals (e.g., the ALU of one or more processors of the monitoring system can change a state of one or more registers or flip flops to cause a buffer, such as a two- or three-state buffer, to drive outputs onto a wire indicative of the signals) to the output device responsive to detecting a misalignment in the route. These signals may cause the output device to notify the operator of the vehicle and/or one or more off-board locations of the misalignment.

A memory 612 represents one or more tangible and non-transitory computer readable media, such as computer hard drives, optical disks, read only memories, random access memories, or the like. The monitoring system can generate and communicate signals (e.g., the ALU of one or more processors of the monitoring system can change a state of one or more registers or flip flops to cause a buffer, such as a two- or three-state buffer, to drive outputs to an address bus for writing information to the memory) to the memory to store instantaneous DoCs, nominal DoCs, and/or DoC deviations calculated by the ALU of the monitoring system. The monitoring system can obtain the nominal DoCs and/or instantaneous DoCs used to calculate the nominal DoCs and/or DoC deviations from the memory (e.g., the ALU can obtain inputs received from one or more buffers driven by signals on a wire connected with the buffers and the memory).

Figure 7:
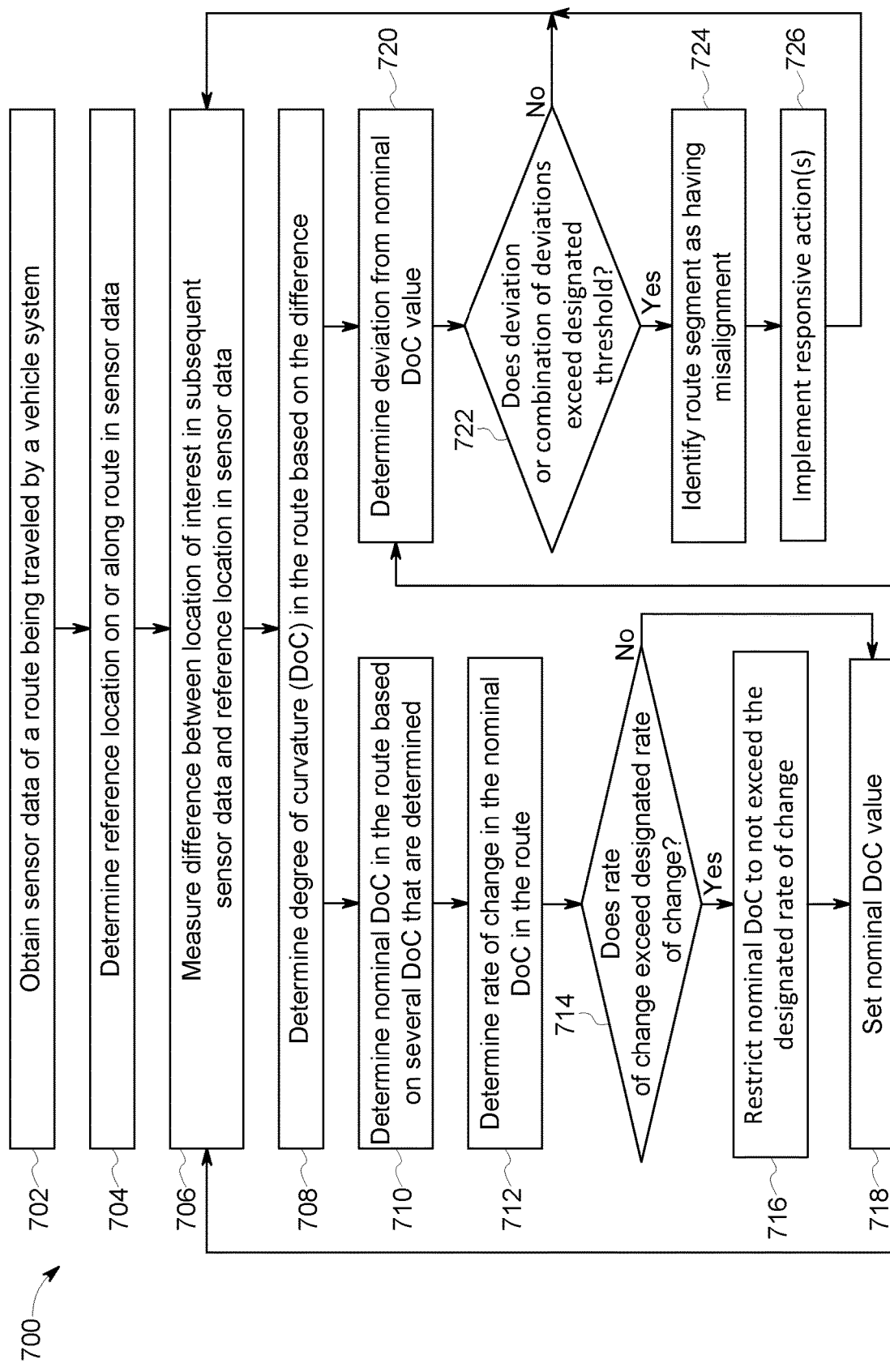
FIG. 7 illustrates a flowchart of one embodiment of a method for inspecting a route.

FIG. 7 illustrates a flowchart of one embodiment of a method 700 for inspecting a route. The method 700 may be performed by the route inspection system described herein. The data used to inspect the route can be sensed and provided to the one or more processors of the monitoring system by the sensor or sensors. The ALU of one or more processors of the monitoring system may perform the comparisons and the calculations described herein using this data. The memory can be written to and accessed by the ALU of one or more processors of the monitoring system as needed for these calculations and comparisons. The method 700 may represent software directing the operations of the monitoring system, or may represent an algorithm that is used to create such software.

At 702, sensor data of the route being traveled by the vehicle system is obtained. This sensor data can include static images, videos, frames of a video, or other optical information representative of a segment of the route recently traveled over by the vehicle system and/or an upcoming segment of the route. The sensor data may be received by the monitoring system from the sensor(s). At 704, a reference location or point in the sensor data is determined. This reference location may be referred to as a datum or a feature of interest in the route, and represents a location on the route and/or a fixed distance from the route.

Figure 8:
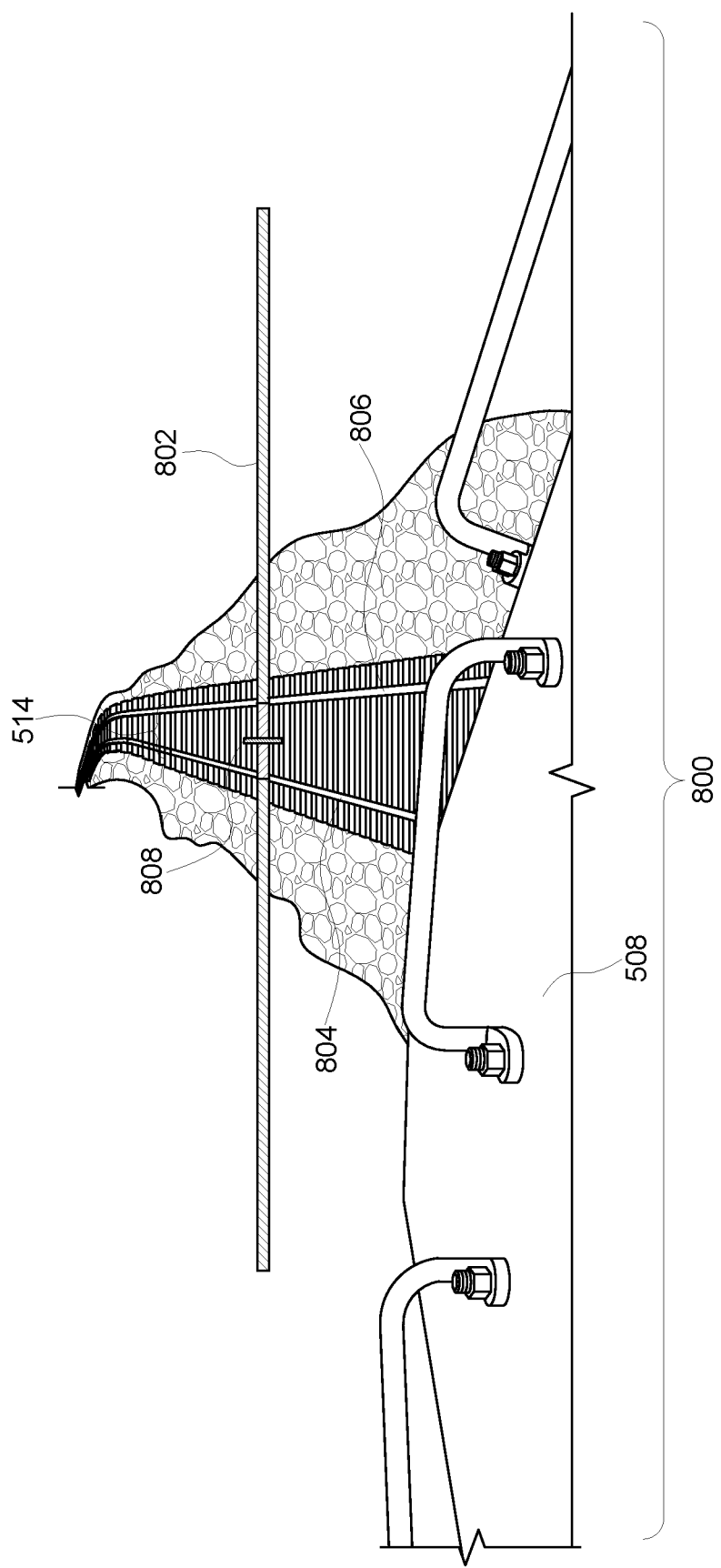
FIG. 8 illustrates one example of sensor data obtained by the route inspection system.

FIG. 8 illustrates one example of sensor data 800 obtained by the monitoring system from one or more of the sensors. The sensor data is an image or frame of a video, and shows a segment of the route. A reference line 802 indicates a designated or fixed distance away from the sensor that provided the sensor data 800 toward the route. This distance may be three meters, six meters, or another distance. In one embodiment, the monitoring system can examine pixels of the sensor data along the reference line to identify where the reference location is located in the sensor data. For example, the ALU of one or more processors in the monitoring system can compare intensities and/or chromaticities of the pixels along the reference line in order to identify locations of route features of interest 804, 806 (such as rails, painted lines on a road, etc.) of the route. The pixels representative of the rails may have intensities and/or chromaticities that are within a designated range of each other (e.g., values within 5%, 10%, or 20% of each other), while pixels representative of other objects in the sensor data may have intensities and/or chromaticities that are outside of this range. By comparing the intensities and/or chromaticities, the ALU of one or more processors in the monitoring system can determine which pixels are indicative of the features of interest in the route. Optionally, aspects of the sensor data other than pixels may be examined. For example, sensors such as infrared sensors, photo multiplied sensors (e.g., night vision sensors), white light sensors, lidar sensors, radar sensors, spectrographic light sensors, etc., may have other aspects or features other than pixels that are examined. These other sensors may output sensor data such as volts or amps (from an analog-to-digital converter), DB or DBmv radio output, light intensities (e.g., in lumens per foot or lux per foot), etc.

The monitoring system may select a reference location 808 in the sensor data along the reference line during travel on a straight section of the route. As described below, locations in subsequently acquired sensor data are compared to this reference location to determine the DoC of segments of the route. The reference location may be calculated by one or more ALUs of the monitoring system as an intersection of a location in the route with the reference line 802. In one embodiment, the reference location is the midway point between the features of interest, such as the center of the route (as shown in FIG. 8), along the reference line. Alternatively, the reference location may be an intersection between an inner or outer edge of the features of interest and the reference line.

Returning to the description of the method 700 shown in FIG. 7, at 706, one or more locations of interest in subsequent sensor data are determined. The monitoring system may examine multiple images or video frames of the sensor data representative of later times and/or different locations along the route to identify locations of interest. The locations of interest that are identified may be the same relative location on the route, but may be located elsewhere in the subsequent sensor data (different than the sensor data used to identify where the reference location is located) due to curvature of the route. The monitoring system can compare the locations of interest with the reference location to determine differences between these locations. These differences can be indicative of curvature of the route.

Figure 9:
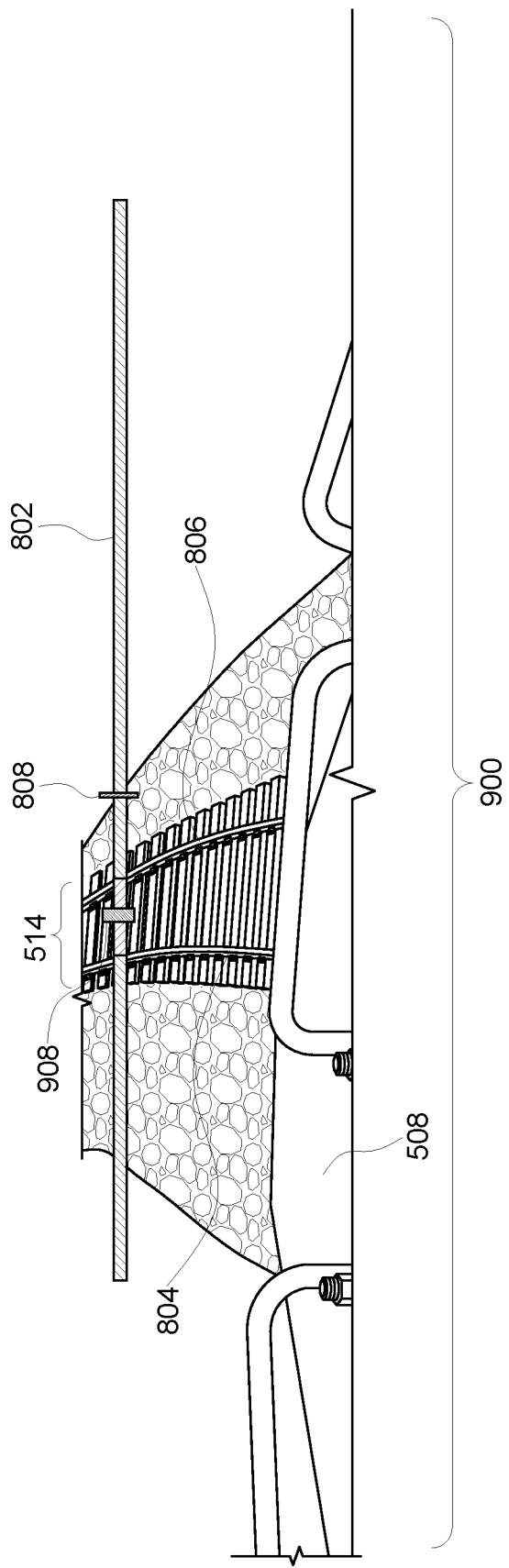
FIG. 9 illustrates another example of sensor data obtained by the route inspection system.

FIG. 9 illustrates another example of sensor data 900 obtained by the monitoring system from one or more of the sensors. The sensor data 900 may be an image or video frame representative of the route at a time or location subsequent to the sensor data 800 shown in FIG. 8. The monitoring system examines the sensor data 900 in a similar manner to as described above in connection with the sensor data 800 shown in FIG. 8 to identify a location of interest 908 in the sensor data 900. For example, the monitoring system can examine the sensor data 900 to find the midpoint between the rails 804, 806 of the route 512 as the location of interest 908.

As shown in FIGS. 8 and 9, the location of interest 908 in the sensor data has moved (e.g., to the left in the perspective of FIGS. 8 and 9) away from the location of the reference location 808 in the sensor data. This movement or change in the reference location indicates that the route is curving. The DoC of the route (e.g., the instantaneous DoC of the route) can be determined based on this change in the reference location.

Figure 10:
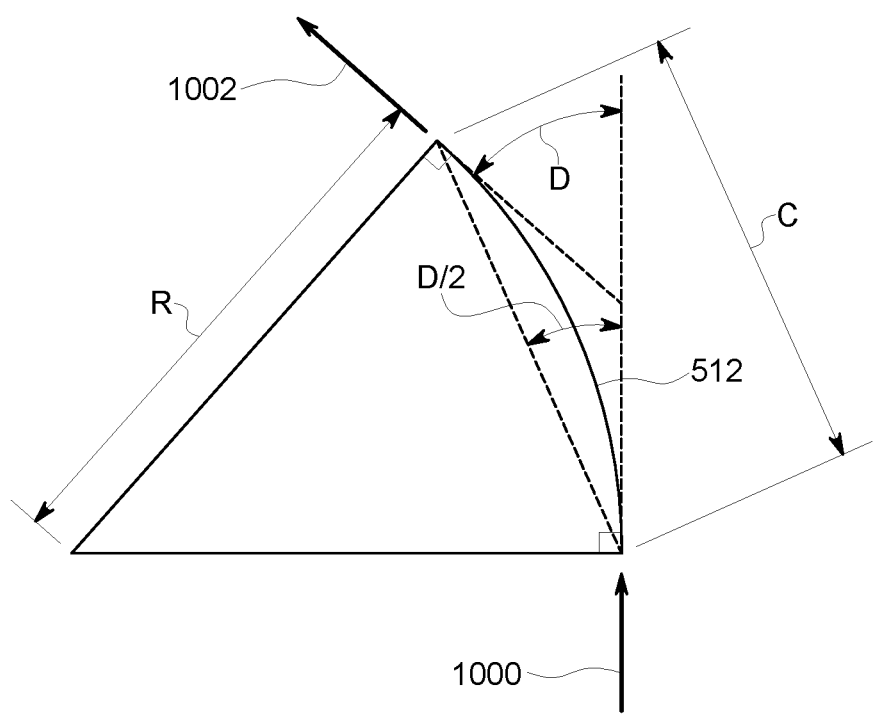
FIG. 10 schematically illustrates calculation of an instantaneous degree of curvature (DoC) of a route according to one example.

Returning to the description of the method 700 shown in FIG. 7, at 708, an instantaneous DoC in the route is determined based on the difference between the location of interest and the reference location. FIG. 10 schematically illustrates calculation of an instantaneous DoC of a route according to one example. The DoC represents a difference in trajectory (or heading or path of the route) after traveling along an arc of a chord length C. The chord length can be selected by an operator of the monitoring system or may have a default value, such as 100 feet or 30.5 meters, or another distance. The larger that this difference is between the trajectories, the sharper the curve is in the route. The smaller this difference is, the more gradual the curve is in the route.

For example, a DoC can be expressed as or can represent an angular difference D between a previous trajectory 1000 and a subsequent trajectory 1002. A radius of curvature R of the segment of the route can be calculated based on the difference D in trajectories as follows:

$$R = \frac{C}{2\sin\frac{D}{2}}$$

As the difference in trajectories D becomes larger (e.g., closer to ninety or 270 degrees), the radius of curvature R becomes smaller. But, the monitoring system may not be able to calculate the DoC directly from the sensor data. Instead, the monitoring system may use differences or changes in the reference location in the sensor data to approximate or estimate the DoC of the route.

Figure 11:
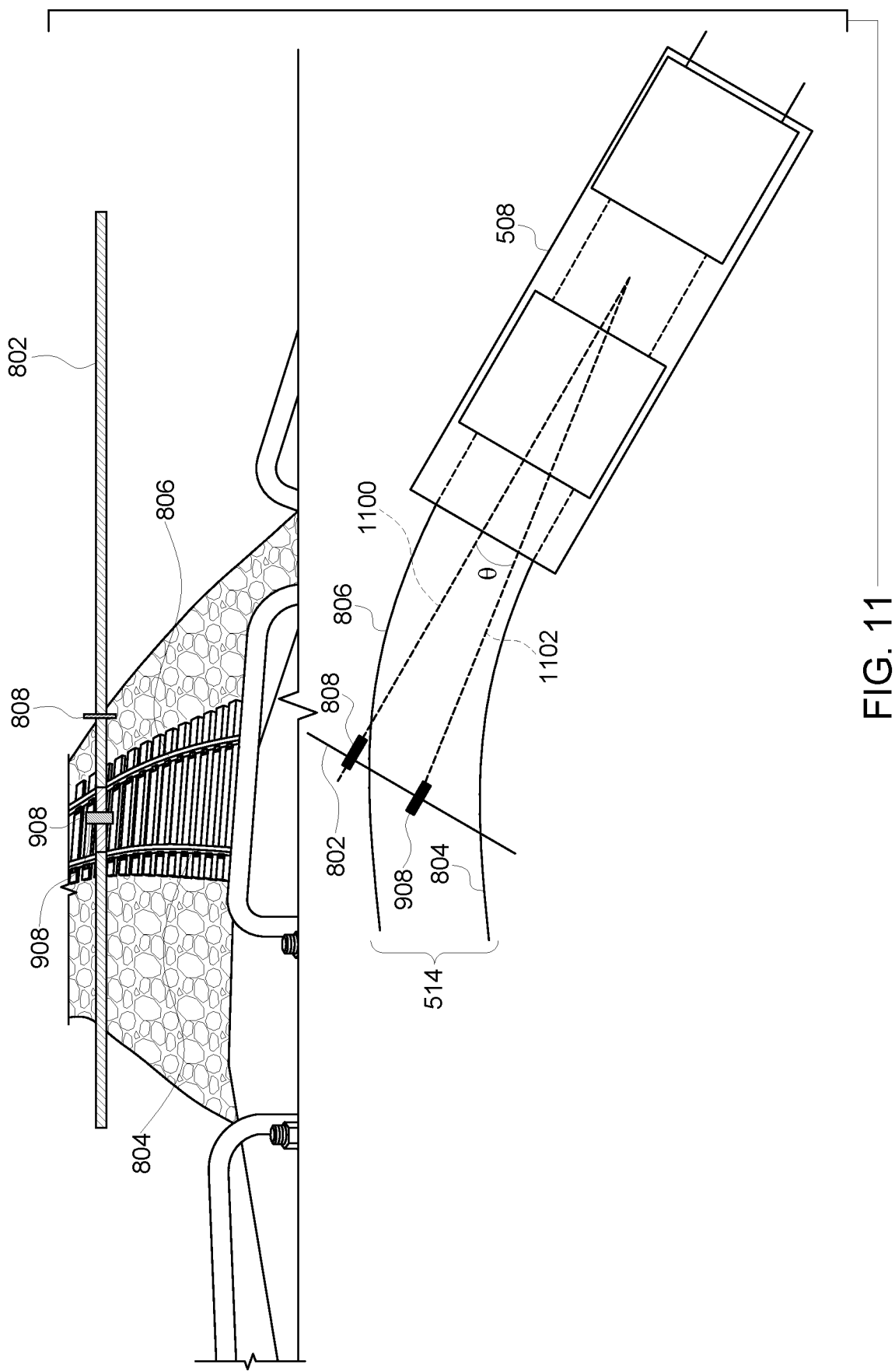
FIG. 11 schematically illustrates a top view of a vehicle shown in FIG. 5 during travel on a route.

FIG. 11 schematically illustrates a top view of the vehicle 508 during travel on the route 512 and the sensor data 900 shown in FIG. 9. Also shown in FIG. 11, the location of interest 908 along the route 512 has moved away from the reference location 808, which indicates that the route is curving. One or more ALUs of the processors in the monitoring system can compare the locations of the location of interest and the reference location in the sensor data to determine how far the location of interest is from the reference location. A theta angle Θ represents the angular difference or angle between a straight reference line 1100 extending to the reference location 808 and a straight examination line 1102 to the location of interest 908.

Figure 12:
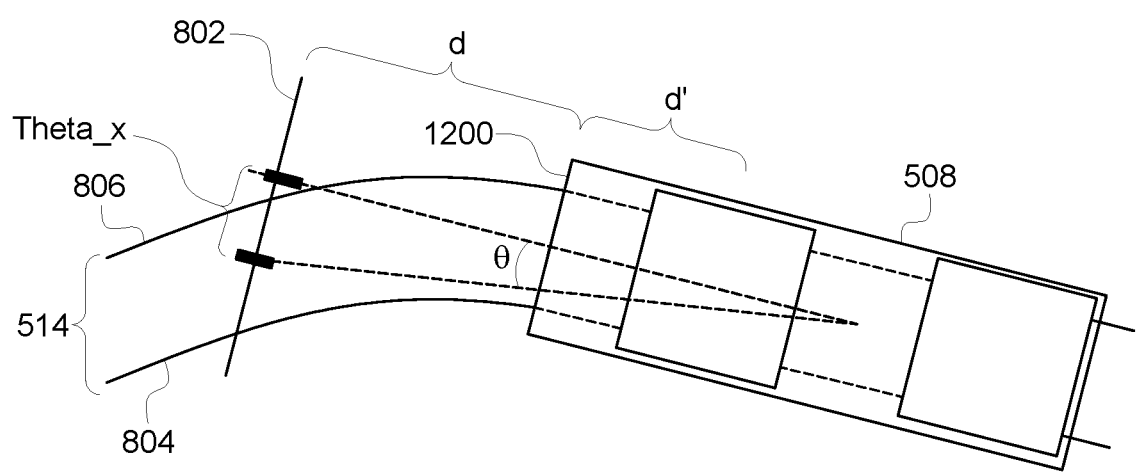
FIG. 12 schematically illustrates another top view of the vehicle according to the example shown in FIG. 11.

FIG. 12 schematically illustrates another top view of the vehicle 508 according to the example shown in FIG. 11. The monitoring system (e.g., the ALU of one or more processors of the monitoring system) can calculate a distance between the location of interest 908 in the sensor data 900 and the reference location 808 in the sensor data 800 to determine a DoC of the route. This distance is referred to as a theta$_x$ distance, as shown in FIG. 12. This theta$_x$ distance and a separation distance (d+d') from the sensor 600 to the fixed distance from the sensor 600 (e.g., the reference line 802) form a right angle, which forms a right triangle, as shown in FIG. 12. The theta$_x$ distance may be measured in units of pixels or other units within the sensor data by the monitoring system (e.g., the ALU of one or more processors of the monitoring system). The monitoring system (e.g., the ALU of one or more processors of the monitoring system) may then convert this pixel distance by multiplying this pixel distance (or number of pixels) by a scaling factor that converts the pixel distance to another distance (e.g., inches, centimeters, etc.).

In one embodiment, the separation distance (d+d') is a combination (e.g., sum) of a distance (d') from halfway between the front and rear trucks of the vehicle (e.g., trucks of a locomotive) to an outer end 1200 of the vehicle and a distance (d) from an outer end 1200 of the vehicle to the location of the reference line. Because the sensor does not move with respect to the vehicle and the reference line represents a fixed location relative to the sensor and/or outer end of the vehicle, the separation distance is a fixed distance in one embodiment.

Figure 13:
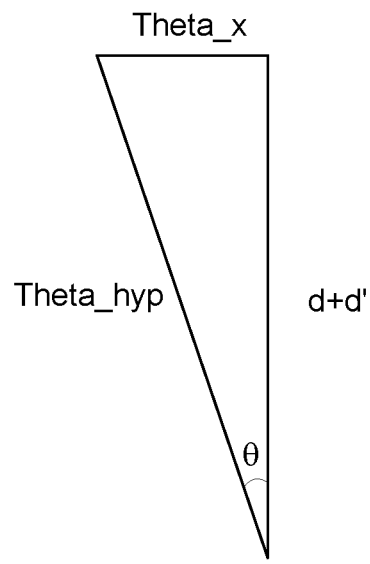
FIG. 13 illustrates a relationship between a separation distance between a sensor of the route inspection system and a reference line and a theta$_x$ distance according to one example.
Figure 14:
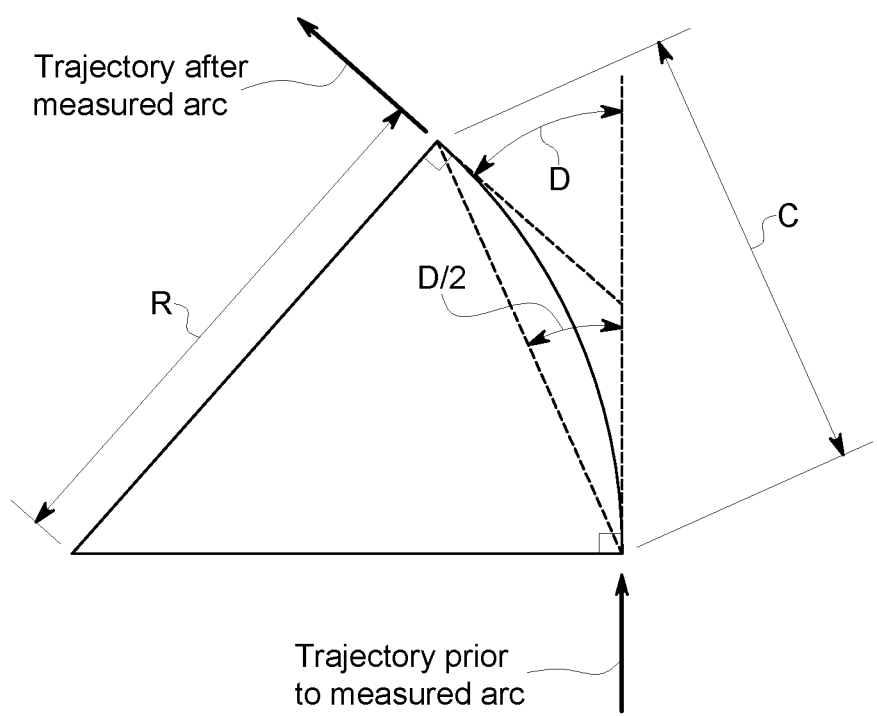
FIG. 14 also illustrates the relationship between the separation distance and the theta$_x$ distance.

FIGS. 13 and 14 illustrate relationships between the separation distance (between the sensor 600 and the reference line 802) and the theta$_x$ distance according to one example. Theta (θ) is the angle measured by the sensor using a chord length of theta$_{hyp}$. Theta$_{hyp}$ and θ can be used to calculate D for a chord length C. The value of theta$_{hyp}$ varies based on the value of θ:

$$theta_{hyp} = \frac{theta_x}{\sin\theta}$$

The radius of curvature R of the route can be determined as follows:

$$R = \frac{chordlength}{2\sin(angle)}$$

This radius can be determined from the values of the chord length (C) and the value of D:

$$R = \frac{C}{2\sin\frac{D}{2}}$$

The chord length C can have a fixed value (e.g., 100 feet) in one embodiment.

Optionally, the radius of curvature R can be calculated from theta$_{hyp}$ and θ:

$$R = \frac{theta_{hyp}}{2\sin\theta}$$

where theta$_{hyp}$ is a variable chord length.

This relationship can be used to convert θ and theta$_{hyp}$ into the DoC (e.g., D) by setting the equations equal to each other:

$$\frac{C}{2\sin\frac{D}{2}} = \frac{theta_{hyp}}{2\sin\theta}$$

The value of the DoC (e.g., D in FIG. 14) can be determined as follows:

$$D = 2\sin^{-1}\frac{C\sin^2\theta}{theta_x}$$

If the value of the chord length C is known to the monitoring system (e.g., a default value is used, such as 100 feet or 1200 inches, and is accessible by the ALU in the memory via the address bus), then the instantaneous DoC can be calculated as:

$$D = 2\sin^{-1}\frac{1200\sin^2\theta}{theta_x}$$

Returning to the description of the method 700 shown in FIG. 7, the method 700 can include two sets of operations performed concurrently, simultaneously, or sequentially. A first set of operations (e.g., 710 through 718) is performed to determine and update the nominal DoC of the route being traveled upon and a second set of operations (e.g., 720 through 726) is performed to compare the instantaneous DoC with the nominal DoC to determine whether a misalignment in the route is detected.

At 710, the nominal DoC of the route is determined. The nominal DoC may be calculated by the monitoring system (e.g., the ALU of one or more processors) obtaining previous measurements of the instantaneous DoC (e.g., from the memory) and calculating a moving average in one embodiment. For example, the monitoring system may calculate an average of the ten, twenty, fifty, or the like, most recently calculated instantaneous DoCs as the nominal DoC. Optionally, the monitoring system may use another calculation, such as an average of the instantaneous DoCs determined during travel on a curved portion of the route.

At 712, a rate in change in the nominal DoC is determined. The nominal DoC may change as the vehicle moves along the route due to the curvature in the route not being the same along the entirety of the route. Several nominal DoCs may be determined (e.g., at 710) and stored in the memory. The monitoring system (e.g., the ALU of one or more processors) may access the memory and examine how quickly the nominal DoCs are changing with respect to distance along the route.

At 714, a determination is made as to whether the nominal DoC is changing at a rate that exceeds a designated rate of change. The curvature in a route may be limited by legal and/or regulatory restrictions to prohibit the route from curving too sharply (and thereby introducing a significant safety risk). As one example, 37 C.F.R. § 213 may set forth restrictions on the geometric of a rail track, which can include limitations on the curvature of the track.

The monitoring system (e.g., the ALU of one or more processors) may compare the rate of change in the nominal DoC (e.g., determined at 712) with a designated rate of change stored in the memory (e.g., which the ALUs may access via the address bus of the processor(s) of the monitoring system). The designated rate of change may be dictated by one or more laws or regulations, or may be input by an operator (e.g., via the input device).

If the rate of change in the nominal DoC exceeds the designated rate of change, then the nominal DoC is changing too rapidly (e.g., relative to distance along the route) and may need to be limited to provide meaningful analysis. For example, the rapid rate of change in the nominal DoC may be indicative of a thermal misalignment occurring over a relatively long portion of the route instead of a sharp curve in the route. To avoid the rapid rate of change in the nominal DoC from being incorrectly identified as the curvature in the route without any misalignment, flow of the method 700 may proceed toward 716 in order to limit the nominal DoC change.

But, if the rate of change in the nominal DoC does not exceed the designated rate of change, then the nominal DoC is not changing too rapidly and may be used for detection of misalignments in the route. As a result, flow of the method 700 may proceed toward 718.

At 716, the value of the nominal DoC is restricted (e.g., changed or prevented from changing) so that the rate of change in the nominal DoC does not exceed the designated rate of change. For example, if a current value of the nominal DoC (e.g., determined at 710) would cause the rate of change in the DoC to exceed the designated rate of change, then the monitoring system (e.g., the ALU of one or more processors) may reduce the rate of change by changing the value of the nominal DoC. The monitoring system may iteratively reduce the nominal DoC by increasingly larger values until the monitoring system calculates that the rate of change in the nominal DoC (with the reduced value) no longer exceeds the designated rate of change. The monitoring system may then use this reduced value of the nominal DoC, as described below. The ALU of one or more processors may write this reduced value to the memory (e.g., via the address bus of the one or more processors).

At 718, the value of the nominal DoC is set. If the monitoring system did not need to adjust the value of the nominal DoC at 714 and 716, then the value of the nominal DoC may be set (e.g., stored in the memory via the address bus of one or more processors of the monitoring system) as the value calculated at 710. But, if the monitoring system did adjust the value of the nominal DoC at 714 and 716 (e.g., to prevent the rate of change in the nominal DoC from being too large), then the value of the nominal DoC may be set (e.g., stored in the memory via the address bus of one or more processors of the monitoring system) as the value determined at 716.

Flow of this portion of the method 700 may then return toward 706. For example, after setting the value of the nominal DoC, another instantaneous DoC may be determined, the nominal DoC updated using this additional instantaneous DoC, and the rate of change in the nominal DoC examined to determine whether to restrict the value of the DoC, as described above. This process may be repeated several times to keep updating the nominal DoC.

With respect to the set of operations in the method 700 at 720 through 726, at 720, a deviation from the nominal DoC is determined. For example, the instantaneous DoC determined at 708 may be compared with the nominal DoC to determine a difference between the instantaneous DoC and the nominal DoC. The monitoring system (e.g., the ALU of one or more processors in the monitoring system) may calculate this difference by subtracting the nominal DoC from the instantaneous DoC (or by subtracting the instantaneous DoC from the nominal DoC). The difference may represent the DoC deviation that is determined at 720.

At 722, a determination is made as to whether the DoC deviation exceeds a designated threshold. The monitoring system (e.g., the ALU of one or more processors in the monitoring system) can compare the DoC deviation to a designated threshold that may be stored in the memory. The designated threshold may have a non-zero value to prevent small deviations from incorrectly being identified as misalignments in the route. The designated threshold may have a value that is set by an operator (e.g., via the input device). If the DoC deviation exceeds the threshold, then the deviation may indicate a misalignment in the route. As a result, flow of the method 700 can proceed toward 724. Alternatively, if the DoC deviation does not exceed the threshold, then the deviation may not indicate a misalignment in the route. As a result, flow of the method 700 can return toward 706 to repeat the determination and examination of another instantaneous DoC.

In another embodiment, the monitoring system may compare several DoC deviations to the designated threshold. The monitoring system (e.g., the ALU of one or more processors) may sum a designated number of DoC deviations (e.g., the most recent ten, twenty, etc., of the DoC deviations) to calculate a summed DoC deviation. If the summed DoC deviation exceeds the threshold, then the deviations may indicate a misalignment in the route. As a result, flow of the method 700 can proceed toward 724. Alternatively, if the summed DoC deviation does not exceed the threshold, then the summed deviation may not indicate a misalignment in the route. As a result, flow of the method 700 can return toward 706 to repeat the determination and examination of another instantaneous DoC.

As another example, the monitoring system (e.g., the ALU of one or more processors) may calculate an average (or moving average) of a designated number of DoC deviations (e.g., the most recent ten, twenty, etc., of the DoC deviations) to calculate an averaged DoC deviation. If the averaged DoC deviation exceeds the threshold, then the deviations may indicate a misalignment in the route. As a result, flow of the method 700 can proceed toward 724. Alternatively, if the averaged DoC deviation does not exceed the threshold, then the averaged deviation may not indicate a misalignment in the route. As a result, flow of the method 700 can return toward 706 to repeat the determination and examination of another instantaneous DoC.

At 724, the segment of the route is identified as having a misalignment. For example, the portion of the route from which the instantaneous DoC or several instantaneous DoCs that were measured and that resulted in the monitoring system identifying the DoC deviation, summed DoC deviation, and/or averaged DoC deviation as being indicative of a misalignment may be identified as having a misalignment. The monitoring system (e.g., the ALU of one or more processors) may store data or a datum in the memory that represents the misalignment and/or a location of the misalignment along the route. The location of the misalignment along the route may be provided by the input device, which optionally can include a global positioning system, dead reckoning system, or other location determining system (e.g., a tachometer that measures speed of the vehicle and a clock that measures passage of time to allow the location of the vehicle along the route to be calculated).

At 726, one or more responsive actions are implemented. One or more of these actions may be performed in response to identifying the misalignment. For example, the monitoring system (e.g., the ALU of one or more processors) may generate and communicate a signal to the controller to direct the vehicle to automatically slow or stop movement. Optionally, the monitoring system may generate and communicate a signal to the output device to direct the output device to communicate a signal to other vehicles heading toward and/or scheduled to travel over the thermal misalignment to warn the other vehicles. Additionally or alternatively, the monitoring system may generate and communicate a signal to the output device to direct the output device to communicate a signal to other vehicles heading toward and/or scheduled to travel over the thermal misalignment to automatically and remotely control the other vehicles to slow or stop movement during travel over the thermal misalignment.

As another example, the monitoring system may generate and communicate a signal to the output device to direct the output device to communicate a signal to other vehicles heading toward and/or scheduled to travel over the thermal misalignment to automatically and remotely control the other vehicles to change routes to avoid traveling over the thermal misalignment. Optionally, the monitoring system may generate and communicate a signal to the output device to direct the output device to communicate a signal to one or more route devices (e.g., switches, gates, etc.) that control where vehicles travel on the route that automatically and remotely controls the route device(s) to cause the other vehicles to travel on other routes (e.g., change a state of a switch to cause other vehicles to travel around and not over the thermal misalignment).

The monitoring system may generate and communicate a signal to the output device to direct the output device to communicate a signal to a scheduling or dispatch facility to cause the schedule of one or more other vehicles to be changed to cause the one or more other vehicles to not travel over the thermal misalignment. Optionally, the monitoring system may generate and communicate a signal to the output device to direct the output device to communicate a signal to repair personnel that causes the personnel to travel to the thermal misalignment and inspect and/or repair the misalignment.

In one embodiment, a system (e.g., a route inspection system) includes one or more processors configured to identify a reference location in sensor data provided by one or more sensors onboard a vehicle system. The reference location is identified along a route being traveled by the vehicle system. The one or more processors also are configured to identify a location of interest in subsequent sensor data provided by the one or more sensors. The location of interest identified along the route being traveled by the vehicle system. The one or more processors also are configured to determine a degree of curvature in the route based on a difference between the reference location and the location of interest.

In one example, the one or more sensors include one or more of a camera or a lidar sensor.

In one example, the sensor data and the subsequent sensor data include one or more of images, a video, or video frames of the route.

In one example, the one or more sensors include an optical sensor oriented toward the route along a direction of travel of the vehicle system.

In one example, the one or more sensors include an optical sensor oriented toward the route in a direction that is opposite a direction of travel of the vehicle system.

In one example, the one or more processors are configured to identify the reference location by identifying an intersection between a location on the route and a reference line in the sensor data, the reference line representing a fixed distance from the one or more sensors.

In one example, the one or more processors are configured to identify the location of interest by identifying an intersection between the location on the route used to determine the reference location and a reference line in the sensor data.

In one example, the difference between the reference location and the location of interest represents a change in trajectory of the route at different locations of the one or more sensors along the route.

In one example, the one or more processors also are configured to determine a nominal degree of curvature of the route based on the degree of curvature that is determined.

In one example, the one or more processors are configured to determine the degree of curvature of the route one or more additional times. The nominal degree of curvature is determined as a moving average of the degrees of curvature that are determined.

In one example, the one or more processors are configured to determine a rate of change in the nominal degree of curvature, compare the rate of change that is determined to a designated threshold, and change a value of the nominal degree of curvature responsive to the rate of change exceeding the designated threshold.

In one example, the one or more processors are configured to identify a misalignment in the route based on the degree of curvature that is determined.

In one example, the misalignment is a thermal misalignment of a conductive portion of the route.

In one example, the one or more processors are configured to determine a deviation of the degree of curvature from the nominal degree of curvature. The misalignment is determined based on the deviation.

In one example, the one or more processors are configured to determine the misalignment responsive to the deviation exceeding a designated threshold.

In one example, the one or more processors are configured to determine the misalignment responsive to a sum of the deviation and one or more previously determined deviations exceeding a designated threshold.

In one example, the one or more processors are configured to determine the misalignment responsive to an average of the deviation and one or more previously determined deviations exceeding a designated threshold.

In one example, the one or more processors are configured to implement one or more responsive actions responsive to determining the misalignment in the route.

In one example, the one or more responsive actions is one or more of automatically slowing or stopping movement of the vehicle system, communicating a warning signal to another vehicle traveling toward the misalignment in the route, communicating the warning signal to another vehicle scheduled to travel toward the misalignment in the route, remotely controlling movement of another vehicle traveling toward the misalignment to alter the movement of the other vehicle, remotely controlling a switch in the route to prevent another vehicle from traveling over the misalignment, and/or communicating a signal to a repair facility to direct repair of the route at the misalignment.

In one embodiment, a method (e.g., for inspecting a route) includes identifying a reference location in sensor data provided by one or more sensors onboard a vehicle system. The reference location is identified along a route being traveled by the vehicle system. The method also includes identifying a location of interest in subsequent sensor data provided by the one or more sensors. The location of interest is identified along the route being traveled by the vehicle system. The method also includes determining a degree of curvature in the route based on a difference between the reference location and the location of interest.

In one example, the sensor data and the subsequent sensor data include one or more of images, a video, or video frames of the route.

In one example, the one or more sensors include a sensor oriented toward the route along a direction of travel of the vehicle system.

In one example, the one or more sensors include a sensor oriented toward the route in a direction that is opposite a direction of travel of the vehicle system.

In one example, identifying the reference location includes identifying an intersection between a location on the route and a reference line in the sensor data, the reference line representing a fixed distance from the one or more sensors.

In one example, identifying the location of interest includes identifying an intersection between the location on the route used to determine the reference location and a reference line in the sensor data.

In one example, the difference between the reference location and the location of interest represents a change in trajectory of the route at different locations of the one or more sensors along the route.

In one example, the method also includes determining a nominal degree of curvature of the route based on the degree of curvature that is determined.

In one example, the method also includes determining the degree of curvature of the route one or more additional times, where the nominal degree of curvature is determined as a moving average of the degrees of curvature that are determined.

In one example, the method also includes determining a rate of change in the nominal degree of curvature, comparing the rate of change that is determined to a designated threshold, and changing a value of the nominal degree of curvature responsive to the rate of change exceeding the designated threshold.

In one example, the method also includes determining a misalignment in the route based on the degree of curvature that is determined.

In one example, the misalignment is a thermal misalignment of a conductive portion of the route.

In one example, the method also includes determining a deviation of the degree of curvature from the nominal degree of curvature, where the misalignment is determined based on the deviation.

In one example, the misalignment is determined responsive to the deviation exceeding a designated threshold.

In one example, the misalignment is determined responsive to a sum of the deviation and one or more previously determined deviations exceeding a designated threshold.

In one example, the misalignment is determined responsive to an average of the deviation and one or more previously determined deviations exceeding a designated threshold.

In one example, the method also includes implementing one or more responsive actions responsive to determining the misalignment in the route.

In one example, the one or more responsive actions is one or more of automatically slowing or stopping movement of the vehicle system, communicating a warning signal to another vehicle traveling toward the misalignment in the route, communicating the warning signal to another vehicle scheduled to travel toward the misalignment in the route, remotely controlling movement of another vehicle traveling toward the misalignment to alter the movement of the other vehicle, remotely controlling a switch in the route to prevent another vehicle from traveling over the misalignment, and/or communicating a signal to a repair facility to direct repair of the route at the misalignment.

In any of the embodiments herein, the vehicle system in conjunction with which the system (e.g., route inspection system) is implemented may be a drone, other aerial vehicle, or other autonomous or remote controlled vehicle. For example, in one particular embodiment, a remote controlled or autonomous aerial drone (e.g., such as a quadcopter) is outfitted with one or more cameras or other optical sensors or other sensors that are configured to output sensor data of a route along which the drone travels, such as above a railway. The drone is controlled and/or configured to follow a path along the route in a manner by which the sensor data is suitable for use in determining a degree of curvature in the route based on a difference between a reference location and a location of interest, as explained herein. For example, if the route is a railway having two nominally parallel rails (i.e., for normal operation in an undamaged condition, the rails are configured to be parallel), the drone may be controlled and/or configured to follow a path along the midpoint between the rails, or to travel above and along one of the rails (e.g., a designated or chosen one of the rails), or to travel along one of the rails but a designated set lateral distance to the left or right of the rail. The one or more processors of the route inspection system may be deployed on board the autonomous or remote controlled vehicle, and/or the autonomous or remote controlled vehicle may transmit the sensor data to an off-board location where the one or more processors are located. Alternatively, one or more of the processors may be deployed on board the autonomous or remote controlled vehicle and one or more of the processors may be located in an off-board location. The off-board processor(s) may be located in a fixed, central location (such as a dispatch or maintenance facility), and/or they may be located on another vehicle or vehicle system. For example, an autonomous or remote controlled vehicle may be carried by a second vehicle or vehicle system (e.g., a drone carried by a locomotive), with the autonomous or remote controlled vehicle being dispatched from the second vehicle periodically for inspection purposes, e.g., ahead of the second vehicle or vehicle system traveling along a route. In such an embodiment, one or more of the route inspection system processors may be on board the second vehicle or vehicle system, with the autonomous or remote controlled vehicle configured to transmit sensor data back to the second vehicle or vehicle system for processing and use by the second vehicle or vehicle system (e.g., for control purposes).

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

The above description is illustrative and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are example embodiments. Other embodiments may be apparent to one of ordinary skill in the art upon reviewing the above description. The scope of the inventive subject matter should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. And, as used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   one or more processors configured to identify a reference location in sensor data provided by one or more sensors onboard a vehicle system, the reference location identified along a route being traveled by the vehicle system, the one or more processors also configured to identify a location of interest in subsequent sensor data provided by the one or more sensors, the location of interest identified along the route being traveled by the vehicle system,
   wherein the one or more processors are configured to determine a degree of curvature in the route based on a difference between the reference location and the location of interest.

2. The system of claim 1, wherein the one or more sensors include one or more of a camera or a lidar sensor.

3. The system of claim 1, wherein the sensor data and the subsequent sensor data include one or more of images, a video, or video frames of the route.

4. The system of claim 1, wherein the one or more sensors include an optical sensor oriented toward the route in a direction that is opposite a direction of travel of the vehicle system.

5. The system of claim 1, wherein the one or more processors are configured to identify the reference location by identifying an intersection between a location on the route and a reference line in the sensor data, the reference line representing a fixed distance from the one or more sensors.

6. The system of claim 1, wherein the difference between the reference location and the location of interest represents a change in trajectory of the route at different locations of the one or more sensors along the route.

7. The system of claim 1, wherein the one or more processors also are configured to determine a nominal degree of curvature of the route based on the degree of curvature that is determined.

8. The system of claim 7, wherein the one or more processors are configured to determine the degree of curvature of the route one or more additional times, wherein the nominal degree of curvature is determined as a moving average of the degrees of curvature that are determined.

9. The system of claim 7, wherein the one or more processors are configured to determine a rate of change in the nominal degree of curvature, compare the rate of change that is determined to a designated threshold, and change a value of the nominal degree of curvature responsive to the rate of change exceeding the designated threshold.

10. A method comprising:
identifying a reference location in sensor data provided by one or more sensors onboard a vehicle system, the reference location identified along a route being traveled by the vehicle system;
identifying a location of interest in subsequent sensor data provided by the one or more sensors, the location of interest identified along the route being traveled by the vehicle system; and
determining a degree of curvature in the route based on a difference between the reference location and the location of interest.

11. The method of claim 10, wherein the sensor data and the subsequent sensor data include one or more of images, a video, or video frames of the route.

12. The method of claim 10, wherein identifying the reference location includes identifying an intersection between a location on the route and a reference line in the sensor data, the reference line representing a fixed distance from the one or more sensors.

13. The method of claim 10, wherein identifying the location of interest includes identifying an intersection between the location on the route used to determine the reference location and a reference line in the sensor data.

14. The method of claim 10, wherein the difference between the reference location and the location of interest represents a change in trajectory of the route at different locations of the one or more sensors along the route.

15. The method of claim 10, further comprising determining a nominal degree of curvature of the route based on the degree of curvature that is determined.

16. The method of claim 15, further comprising determining the degree of curvature of the route one or more additional times, wherein the nominal degree of curvature is determined as a moving average of the degrees of curvature that are determined.

17. The method of claim 15, further comprising determining a rate of change in the nominal degree of curvature, comparing the rate of change that is determined to a designated threshold, and changing a value of the nominal degree of curvature responsive to the rate of change exceeding the designated threshold.

18. A system comprising:
one or more processors configured to identify a reference location in sensor data provided by one or more sensors onboard a vehicle system, the reference location identified along a route being traveled by the vehicle system, the one or more processors also configured to identify a location of interest in subsequent sensor data provided by the one or more sensors, the location of interest identified along the route being traveled by the vehicle system,
wherein the one or more processors are configured to determine a degree of curvature in the route based on a difference between the reference location and the location of interest, and
wherein the one or more processors are configured to implement one or more responsive actions responsive to determining the misalignment in the route, the one or more responsive actions includes one or more of automatically slowing or stopping movement of the vehicle system, communicating a warning signal to another vehicle traveling toward the misalignment in the route, communicating the warning signal to another vehicle scheduled to travel toward the misalignment in the route, remotely controlling movement of another vehicle traveling toward the misalignment to alter the movement of the other vehicle, remotely controlling a switch in the route to prevent another vehicle from traveling over the misalignment, or communicating a signal to a repair facility to direct repair of the route at the misalignment.

19. The system of claim 18, wherein the one or more processors are configured to determine a deviation of the degree of curvature from the nominal degree of curvature, wherein the misalignment is determined based on the deviation.

20. The system of claim 19, wherein the one or more processors are configured to determine the misalignment responsive to one or more of the deviation exceeding a designated threshold, a sum of the deviation and one or more previously determined deviations exceeding a designated threshold, or an average of the deviation and one or more previously determined deviations exceeding a designated threshold.

* * * * *